United States Patent [19]
Nassar et al.

[11] Patent Number: 6,161,577
[45] Date of Patent: Dec. 19, 2000

[54] SOLENOID ASSEMBLY FOR AN AUTOMATIC TRANSMISSION OF A MOTOR VEHICLE

[75] Inventors: Roy S. Nassar, Rochester; Thomas D. Nogle, Troy; Mohamed Fahs, Bloomfield Hills; Charles J. Redinger, Macomb; Charles K. Streetman, Sterling Heights, all of Mich.

[73] Assignee: DaimlerChrysler Corporation, Auburn Hills, Mich.

[21] Appl. No.: 09/282,671

[22] Filed: Mar. 31, 1999

[51] Int. Cl.[7] ........................................... F15B 13/08
[52] U.S. Cl. .................. 137/596.17; 251/129.14; 251/129.2
[58] Field of Search ............... 137/596.17; 251/129.14, 251/129.2

[56] References Cited

U.S. PATENT DOCUMENTS

| | | | |
|---|---|---|---|
| 1,883,957 | 10/1932 | Koch et al. | 251/129.2 X |
| 4,893,652 | 1/1990 | Nogle et al. | 137/596.17 |
| 4,939,928 | 7/1990 | Carle et al. | 73/118.1 |
| 5,115,698 | 5/1992 | Leising et al. | 74/868 |
| 5,174,334 | 12/1992 | Nogle | 137/596.17 |
| 5,458,545 | 10/1995 | Adam et al. | 475/120 |
| 5,823,071 | 10/1998 | Petrosky et al. | 74/606 R |

*Primary Examiner*—Gerald A. Michalsky
*Attorney, Agent, or Firm*—Marc Lorelli

[57] ABSTRACT

A solenoid assembly for an automatic transmission of a motor vehicle. The solenoid assembly includes a housing, a valve, an armature and an electromagnetic device. The valve is mounted within the housing. The valve is operative in a vented state and a non-vented state and includes a plunger and ball combination movable between a first position for establishing the vented state and a second position for establishing the non-vented state. The armature is associated with the valve and is movable in response to the presence and absence of a magnetic field for selectively moving the plunger and ball combination between the first and second positions. The electromagnetic device is operative for creating the magnetic field. The electromagnetic device includes a core and an energizable coil. The core has an upwardly extending outer post with a generally rectangular cross section in a horizontal plane. The energizable coil defines an opening for receiving the first upwardly extending outer post. The core preferably includes a plurality of vertically stacked plates.

19 Claims, 4 Drawing Sheets

SOLENOID ASSEMBLY FOR AN AUTOMATIC TRANSMISSION OF A MOTOR VEHICLE

BACKGROUND OF THE INVENTION

1. Technical Field

The present invention generally pertains to motor vehicles. More particularly, the present invention pertains to a solenoid assembly for an automatic transmission of a motor vehicle.

2. Discussion

Generally speaking, motor vehicles require three basic components. These components include a power plant (such as an internal combustion engine), a power train, and wheels. The internal combustion engine produces force by the conversion of the chemical energy in a liquid fuel into the mechanical energy of motion (kinetic energy). The function of the power train is to transit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

Transmissions are generally referred to as manually actuated or automatic transmissions. Manual transmissions generally include mechanical mechanisms for coupling rotating gears to produce different ratio outputs to the drive wheels. Automatic transmissions are designed to take automatic control of the frictional units, gear ratio selection and gear shifting. A thorough description of an exemplary automatic transmission is set forth in commonly assigned U.S. Pat. No. 5,115,698, which is hereby incorporated by reference as if fully set forth herein.

A conventional automatic transmission includes frictional units which couple a rotational input member to one or more planetary gear sets. Other frictional units, typically referred to as brakes, hold members of the planetary gear set stationary during the flow of power. The drive clutch assemblies can couple the rotating input member of the transmission to the desired elements of the planetary gear sets, while the brakes hold elements of these gear sets stationary. The planetary gear sets provide for various ratios of torque and function to ensure that the available torque and the respective tractive power demand are matched to each other.

Modern electronic transmission control systems typically include a plurality of solenoid actuated valves for controlling hydraulic fluid pressures in response to particular transmission conditions. Each of the solenoids includes a terminal that, when energized, actuates a valve which applies or releases a friction element in response to a transmission controller, as is generally disclosed in commonly assigned U.S. Pat. No. 4,893,652, which is hereby incorporated by reference as if fully set forth herein.

While the transmission control systems heretofore employed, including but not limited to those described in U.S. Pat. Nos. 4,893,652 and 5,115,698 have desirable performance characteristics, there is still room for further improvement in the art.

SUMMARY OF THE INVENTION

It is a general object of the present invention to provide an improved solenoid assembly for controlling an automatic transmission of a motor vehicle.

It is another object of the present invention to provide a solenoid assembly which is inexpensive to manufacture and easy to assemble without error.

It is another object of the present invention to provide a solenoid assembly that is energy efficient and responds quickly.

It is another object of the present invention to provide a solenoid assembly for an automatic transmission of a motor vehicle which incorporates a plurality of rectangular cores and cooperating coils.

It is another object of the present invention to provide a solenoid assembly for an automatic transmission of a motor vehicle which incorporates cores formed from a plurality of stacked plates or laminations.

In one form, the present invention provides a solenoid assembly for an automatic transmission of a motor vehicle. The solenoid assembly includes a housing, a valve, an armature and an electromagnetic device. The valve is mounted within the housing. The valve is operative in a vented state and a non-vented state and includes a plunger and ball combination movable between a first position for establishing the vented state and a second position for establishing the non-vented state. The armature is associated with the valve and is movable in response to the presence and absence of a magnetic field for selectively moving the plunger and ball combination between the first and second positions. The electromagnetic device is operative for creating the magnetic field and includes a core and an energizable coil. The core has an upwardly extending post with a generally rectangular cross section in a horizontal plane. The energizable coil defines an opening for receiving the upwardly extending post.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
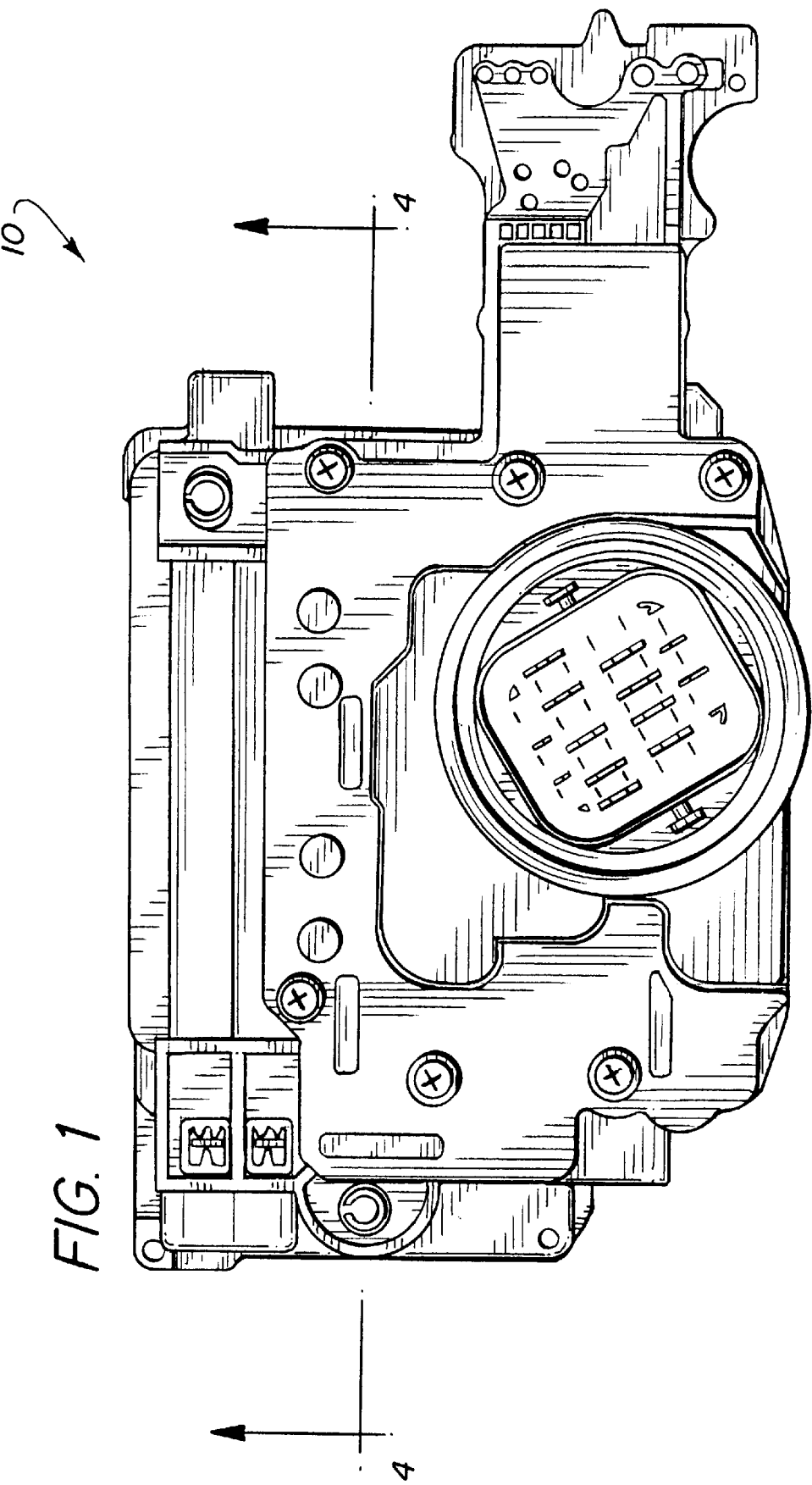
FIG. 1 is a top view of a solenoid assembly constructed in accordance with the teachings of a preferred embodiment of the present invention.

With general reference to drawings, a solenoid assembly constructed in accordance with the teachings of a preferred embodiment of the present invention is generally identified at reference numeral 10. The solenoid assembly 10 is particularly adapted for attachment to an automatic transmission of a motor vehicle. However, it will be appreciated by those skilled in the art that the teachings of the present invention may be used for alternative solenoid applications.

The solenoid assembly 10 is shown to generally include a housing 12 and a plurality of valves 14 for controlling the transfer of hydraulic fluid pressures in response to particular transmission conditions by directing the hydraulic fluid through the housing 12. The housing 12 with the valves 14 communicates through a plastic screen carrier 16 to the transmission valve body assembly. The screen carrier 16 functions to filter particulates out of hydraulic fluid passing through the screen carrier 16, to and from the transmission valve body assembly. The screen carrier 16 has torque retainers to prevent clamping-load loss due to plastic creep. The screen carrier 16 has a bead of flexible seal to prevent leakage.

Figure 4:
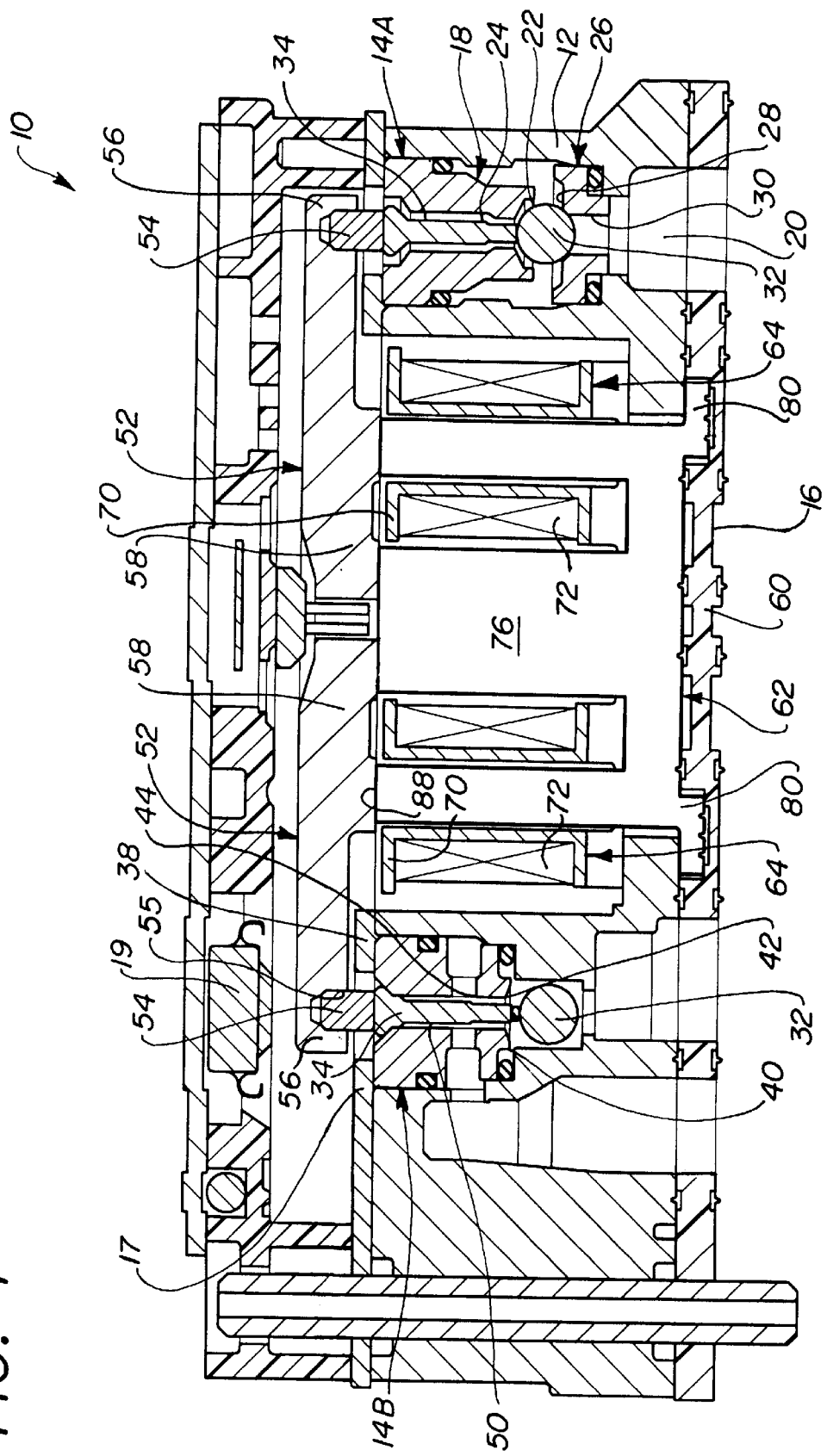
FIG. 4 is a cross-sectional view through one pair of solenoid valves, taken along the line 4—4 of FIG. 1.

The solenoid assembly is mounted to the valve body inside the transmission in a manner well known in the art. A retainer plate 17 holds the valves 14 in place and an insulator assembly 19 is mounted to a top of the housing 12. The retainer 17 also establishes a reference plane for the valves 14 to assure location in the upward vertical direction, as shown in FIG. 4. This is critical for air gap adjustment.

The exemplary embodiment of the present invention includes two normally applied valves 14A and four normally vented valves 14B. The cross-sectional view of FIG. 4 illustrates one of the normally applied valves 14A and one of the normally vented valves 14B. As will become more apparent below, FIG. 4 illustrates the normally applied valve 14A energized to a vented state and the normally vented valve 14B energized to an applied state. In a conventional manner, the normally applied and normally vented valves 14A and 14B cooperate to provide a "limp-home" mode of operation in which reverse, second and third ratios may be manually selected in the event of power failure. A limp-home mode of operation is more fully described in U.S. Pat. No. 5,115,698 which has been incorporated by reference. It will be understood that each of the normally applied valves 14A and each of the normally vented valves 14B are identical to one another. It will be further understood that the structure and function of the valves 14A and 14B, insofar as the present invention is concerned, is similar to that described generally in U.S. Pat. No. 4,893,652.

Briefly, the normally applied valve 14A shown in FIG. 4 is illustrated to include a valve body 18 mounted in the housing 12 and disposed within a fluid path 20. The valve body 18 defines an upper valve seat 22 and a central passage 24 communicating therethrough. The valve 14A further includes a lower seat element 26 defining a lower seat 28 having a central passage 30 communicating therethrough. A steel ball 32 is disposed within the fluid path and movable between a first position in which fluid may pass through the central passage 24 of the upper valve seat 22 and a second position in which fluid is prevented from passing through central passage 24 of the upper valve seat 22. The first position, with the ball 32 pressed against the lower seat 28 (displaced downward) is shown in FIG. 4. In the second position, the steel ball 32 is displaced upward against the seat 22. A plunger 34 having a longitudinal axis aligned with a center of the ball 32 is disposed within a vertically extending channel 36 passing through the valve body 18. The plunger 34 is operated in a manner to be discussed below to move the ball 32 between the first and second positions.

The normally vented valve 14B shown in FIG. 4 includes a valve body 38 having a seating element 40 defining a valve seat 42 and having a central passage 44 communicating therethrough. The normally vented valve 14B further includes a plunger 34 and a steel ball 32 which are nearly identical to those of the normally applied valve 14A. The ball 48 is disposed in a fluid path and below the seating element 40. The plunger 34 extends through an axially extending channel 50 defined by the valve body 38. The steel ball 32 is movable between a first position (shown in FIG. 4) downwardly displaced from the valve seat 42 and a second position (not shown) against the valve seat 42. In the first position, the head of the plunger 34 is downward against the seat 38, thereby closing the upper end of the passage 44 so that the valve 14B is applied. In the second position, the valve 14B is vented around the head of the plunger 34.

An armature 52 is associated with the ball 32 and plunger 34 of each of the valves 14. The armature 52 is movable in a known manner for actuating the associated plunger 34 in response to the presence and absence of a magnetic field. An armature pin 54 is press fit into a first end 56 of the armature 52 and is adapted to selectively engage an upper end of the associated plunger 34. The press fit condition is adjustable, depending on stack conditions. The armature 52 pivots about a second end 58 in response to the presence and absence of the magnetic field.

To provide means for selectively establishing the magnetic field for controlling the armatures 52, the solenoid assembly 10 of the present invention includes an electromagnetic arrangement 60. In the exemplary embodiment, the electromagnetic arrangement 60 is shown to generally include a plurality of cores 62 within to the housing 12 and an electrical coil 64 associated with each of the valves 14. In the preferred embodiment, the electromagnetic arrangement 60 includes three cores 62 and six coils 64.

Figure 2:
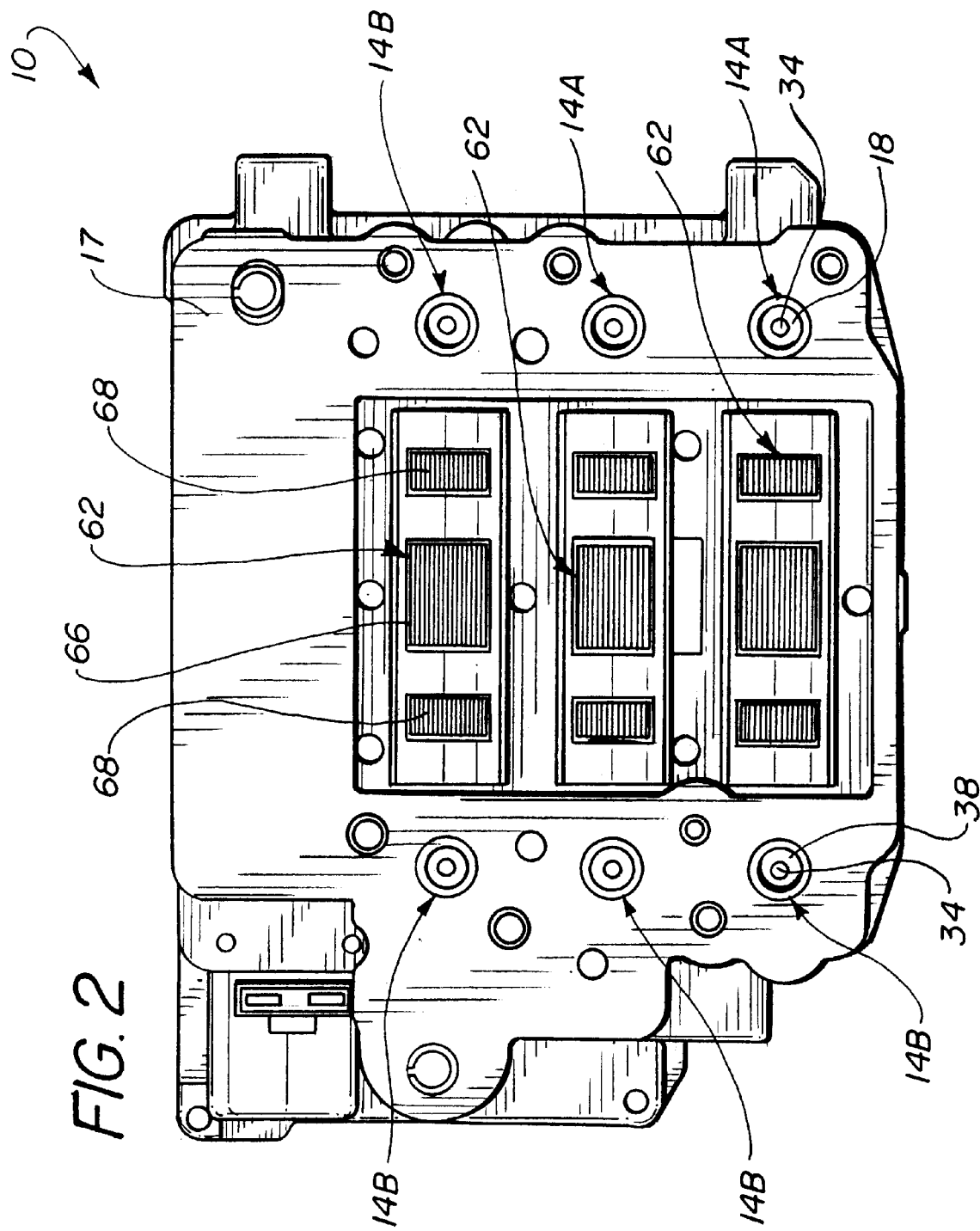
FIG. 2 is top view of the solenoid assembly of the preferred embodiment of the present invention illustrated with the insulator and circuit assembly removed for purposes of illustration.
Figure 3:
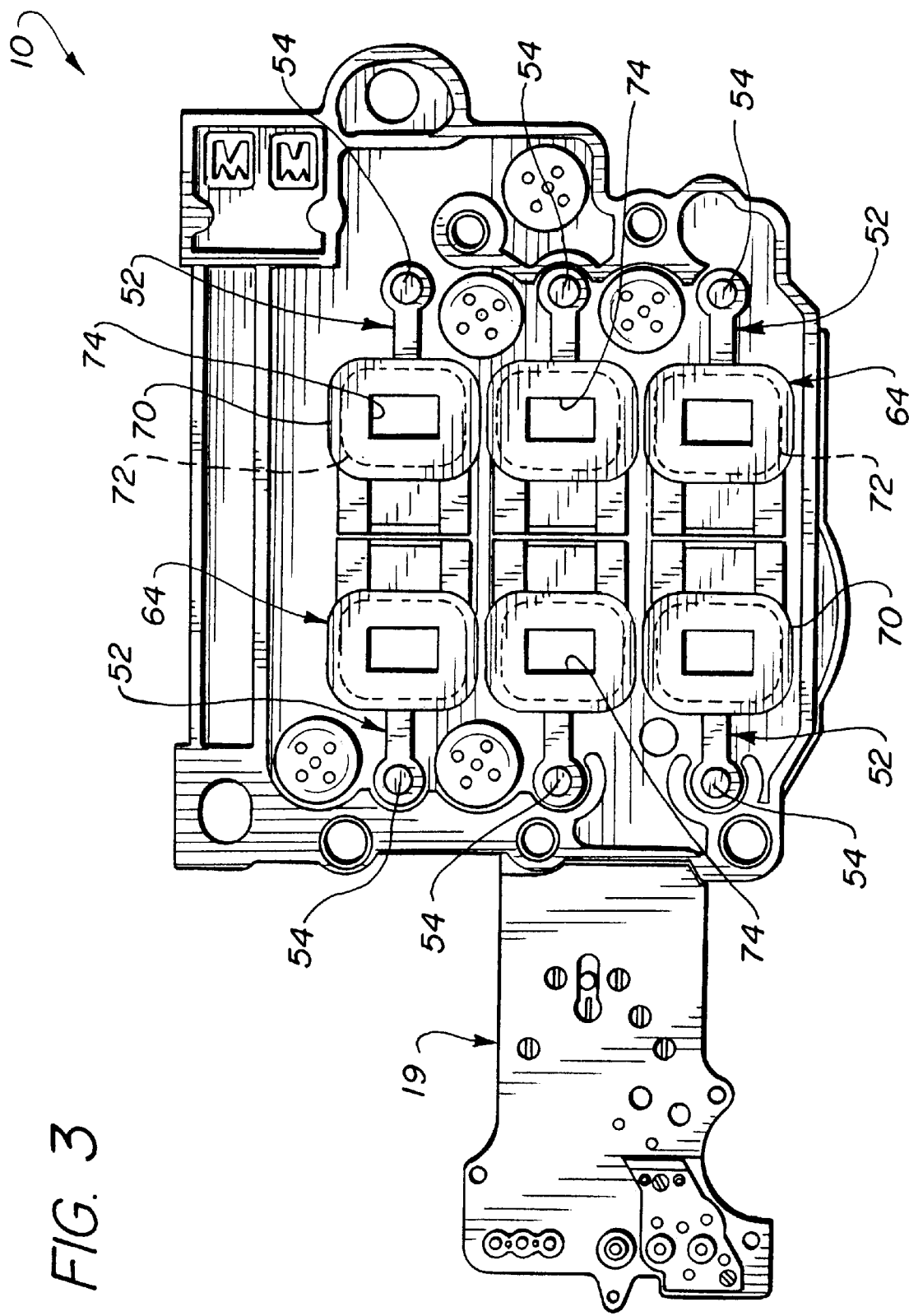
FIG. 3 is a bottom view of the insulator and circuit assembly with the coils of the solenoid assembly of the present invention.

In the preferred embodiment, each core 62 includes an upwardly extending center post 66 and a pair of upwardly extending outer posts 68. As shown most preferably in the top view of FIG. 2, the posts 66 and 68 are generally rectangular in horizontal cross section. Each of the electrical coils 64 of the electromagnetic arrangement 60 includes a plastic coil body 70 and a plurality of copper windings 72. As shown most particularly in FIG. 3, each coil body 70 defines a generally rectangular aperture 74. The rectangular apertures 74 are sized to receive one of the outer posts 68. Each electrical coil 64 includes a pair of terminals (not shown) which plug into an underside of the insulator assembly 16 in a conventional manner. In a known manner, the terminals provide electricity to the plurality of copper windings 72.

In the exemplary embodiment, each of the cores 62 includes a plurality of stamped metal plates 76. In the preferred embodiment, the plates 76 are substantially identical and are vertically stacked and retained to one another. In one application, each core 62 includes twenty-four (24) stacked plates 76. However, it will be understood that more or less plates 76 may be used. While not specifically shown, it will be further understood that each plate is semi-pierced to create a small, circular area which protrudes from one side. Adjacent plates retained through a snug press fit between these areas. A capillary of oil film which results from immersion of the cores 62 in transmission fluid functions as an insulative coating on the plates 76 to minimize electrical contact between adjacent plates 76.

The stacked plates 76 are illustrated to each have a generally M-shape which is inverted. Three legs of the stacked plates 76 extend upwardly and cooperate to define the center and outer posts 66 and 68. The plates 76 include a pair of horizontally extending segments 80 which oppose an underside of the housing 12. The screen carrier 16 holds the cores 62 against the housing 12, thereby eliminating the need for separate core retaining fasteners. O-rings maintain a load on the valves 14A and 14B against the retainer 17. This arrangement allows easy measurement of adjustment by measuring dimensions from the core 62 to either valve 14A or 14B. A desired press height for the pin 54 can be established.

The stacked plates 76 are more easily manufactured than conventional cylindrical core posts which are turned. In addition, the stacked plates increase the amount of magnetic flux created by energizing of an associated electrical coil 64. As a result, clearances between the coil body 70 and the outer posts 68 of the cores 62 can be increased. This permits easier assembly.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A solenoid assembly for an automatic transmission of a motor vehicle, the solenoid assembly comprising:
    a housing;
    a first valve mounted within said housing, said first valve operative in a vented state and a non-vented state;
    a first armature associated with said first valve movable in response to the presence and absence of a magnetic field for selective operation of said first valve in one of said vented state and unvented state;
    a second valve mounted within said housing, said second valve operative in a vented state and a non-vented state;
    a second armature associated with said second valve movable in response to the presence and absence of said magnetic field for selective operation of said second valve in one of said vented state and said unvented state; and
    an electromagnetic arrangement for creating said magnetic field, said electromagnetic arrangement including a core, a first energizable coil and a second energizable coil, said core having a first upwardly extending outer post with a generally rectangular cross section in a horizontal plane, a second upwardly extending outer post with a generally rectangular cross section in a horizontal plane, an upwardly extending center post interdisposed between said first and second upwardly extending outer posts, said first energizable coil defining a first opening for receiving said first upwardly extending outer post, said second energizable coil defining a second opening for receiving said second upwardly extending outer post.

2. The solenoid assembly for an automatic transmission of a motor vehicle of claim 1, wherein said opening defined by said energizable coil has a generally rectangular cross section in a horizontal plane.

3. The solenoid assembly for an automatic transmission of a motor vehicle of claim 1, wherein said core includes a plurality of stacked plates.

4. A solenoid assembly for an automatic transmission of a motor vehicle, the solenoid assembly comprising:
    a housing;
    a first valve mounted within said housing, said first valve operative in a vented state and a non-vented state, said first valve including a plunger and ball combination movable between a first position for establishing said vented state and a second position for establishing said non-vented state;
    a second valve mounted within said housing, said second valve operative in a vented state and a non-vented state, said second valve including a plunger and ball combination movable between a first position for establishing said vented state and a second position for establishing said non-vented state;
    an armature movable in response to the presence and absence of a magnetic field for selectively moving said plunger and ball combination between said first and second positions; and
    an electromagnetic arrangement for creating said magnetic field, said electromagnetic arrangement including a core and an energizable coil, said core including a first upwardly extending outer post, a second upwardly extending post, and an upwardly extending center post interdisposed between said first and second upwardly extending outer posts, said first energizable coil defining an opening for receiving said first upwardly extending outer post, said core including a plurality of stacked plates.

5. The solenoid assembly for an automatic transmission of a motor vehicle of claim 4, wherein said plurality of stacked plates are vertically stacked.

6. The solenoid assembly for an automatic transmission of a motor vehicle of claim 4, further comprising
    a second armature associated with said second valve movable in response to the presence and absence of said magnetic field for selectively moving said plunger and ball combination of said second valve between said first and second positions.

7. The solenoid assembly for an automatic transmission of a motor vehicle of claim 6, wherein said electromagnetic arrangement further includes a second energizable coil defining an opening for receiving said second upwardly extending outer post.

8. The solenoid assembly for an automatic transmission of a motor vehicle of claim 6, wherein said first and second upwardly extending outer posts both have a generally rectangular cross section in a horizontal plane.

9. The solenoid assembly for an automatic transmission of a motor vehicle of claim 4, wherein each plate of said plurality of plates are substantially identical.

10. A solenoid assembly for an automatic transmission of a motor vehicle, the solenoid assembly comprising:
    a housing;
    first and second valves mounted within said housing, each valve of said first and second valves operative in a vented state and a non-vented state, said valves each including a plunger and ball combination movable between a first position for establishing said vented state and a second position for establishing said non-vented state;
    first and second armatures movable in response to the presence and absence of a magnetic field for selectively moving said plunger and ball combination of said first and second valves, respectively, between said first and second positions; and
    an electromagnetic arrangement for creating said magnetic field, said electromagnetic arrangement including a core and first and second energizable coils associated with said first and second valves, respectively, said core including a plurality of stacked plates which cooperate to define first and second upwardly extending outer posts receiving said first and second energizable coils, respectively, and an upwardly extending central post disposed between said first and second upwardly extending outer posts.

11. The solenoid assembly for an automatic transmission of a motor vehicle of claim 10, wherein said plurality of stacked plates comprises a plurality of vertically stacked plates.

12. The solenoid assembly for an automatic transmission of a motor vehicle of claim 10, wherein each plate of said plurality of stacked plates is substantially identical.

13. The solenoid assembly for an automatic transmission of a motor vehicle of claim 10, wherein said first and second upwardly extending outer posts both have a generally rectangular cross section in a horizontal plane.

14. A solenoid assembly for an automatic transmission of a motor vehicle, the solenoid assembly comprising:
   a housing;
   first and second valves mounted within said housing, each valve operative in a vented state and a non-vented state;
   first and second armatures associated with said first and second valves, respectively, said first and second armatures independently operable to move an associated one of said first and second valves between said vented state and said non-vented state in response to the presence and absence of a magnetic field; and
   an electromagnetic arrangement for creating said magnetic field, said electromagnetic arrangement including a common core having first and second upwardly extending outer ports and an upwardly extending center post therebetween, a first energizable coil mounted on said first upwardly extending post of said common core and a second energizable coil mounted on said second upwardly extending post of said common core, said first and second upwardly extending posts each having a generally rectangular cross section in a horizontal plane, said first energizable coil defining an opening for receiving said first upwardly extending outer post, and said second energizable coil defining an opening for receiving said second extending outer post.

15. The solenoid assembly for an automatic transmission of a motor vehicle of claim 14, wherein said opening defined by both of said first and second energizable coils has a generally rectangular cross section in a horizontal plane.

16. The solenoid assembly for an automatic transmission of a motor vehicle of claim 14, wherein said center post has a generally rectangular cross-section in a horizontal plane.

17. The solenoid assembly for an automatic transmission of a motor vehicle of claim 14, wherein said common core is defined by a plurality of stacked plates.

18. The solenoid assembly for an automatic transmission of a motor vehicle of claim 14, wherein said common core is defined by a plurality of vertically stacked plates.

19. The solenoid assembly for an automatic transmission of a motor vehicle of claim 14, wherein said common core is generally M-shaped.

\* \* \* \* \*